L. B. WOOLFOLK.
Ice-Cream Freezer.

No. 163,431. Patented May 18, 1875.

WITNESSES
Chas. J. Gooch
Henry Tanner

INVENTOR
Lucien B. Woolfolk
By Knight Bros, Attorneys

THE GRAPHIC CO. PHOTO-LITH. 39 & 41 PARK PLACE, N.Y.

UNITED STATES PATENT OFFICE.

LUCIEN B. WOOLFOLK, OF LEXINGTON, KENTUCKY.

IMPROVEMENT IN ICE-CREAM FREEZERS.

Specification forming part of Letters Patent No. 163,431, dated May 18, 1875; application filed October 24, 1874.

*To all whom it may concern:*

Be it known that I, LUCIEN B. WOOLFOLK, of Lexington, in the county of Fayette and State of Kentucky, have invented an Improvement in Ice-Cream Freezers, of which the following is a specification:

My invention consists in providing any ordinary ice-cream freezer with an offset-pipe for the escape of brine, and also with compartments for containing salt, so arranged that the salt is kept in contact with the top of the brine that surrounds the vessel containing the cream, and forming, in the space between the salt-compartments, the side of the tub, and the cream-bucket, compartments for containing ice, which extend down to the bottom of the brine, the ice and salt compartments being so constructed as to admit of the refrigerating materials being added, as required, without disturbing the cream-bucket.

Figure 1:
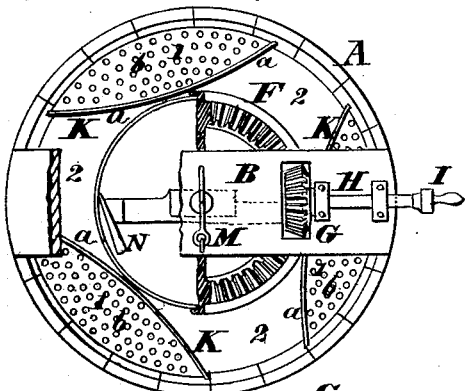
Figure 5:
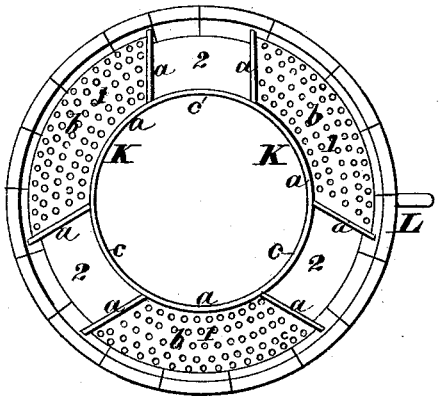
Figure 2:
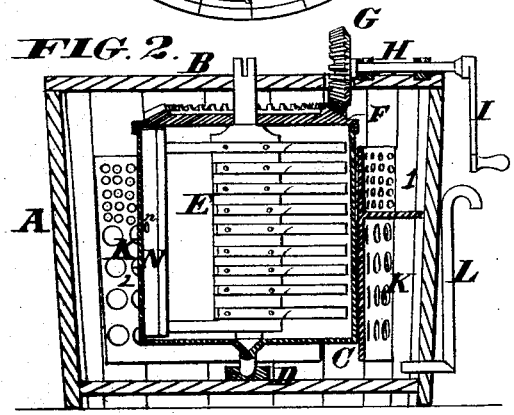
Figure 6:
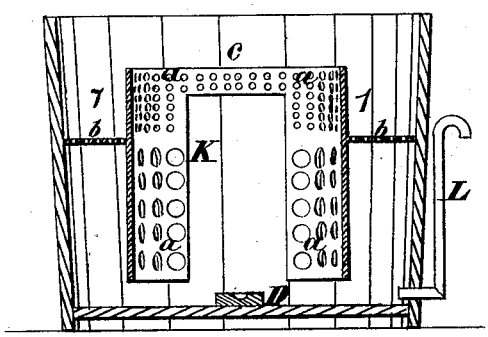
Figure 3:
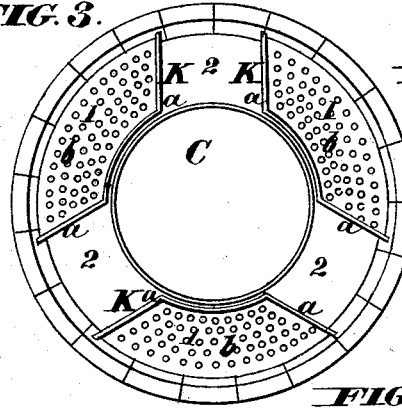
Figures 4, 9:
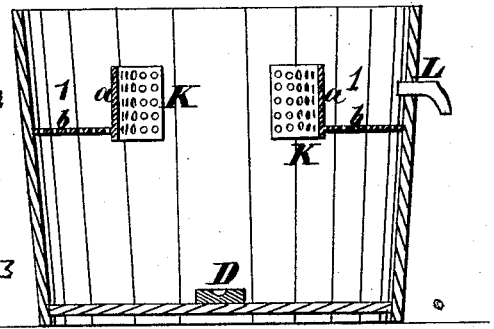
Figure 7:
Figure 8:
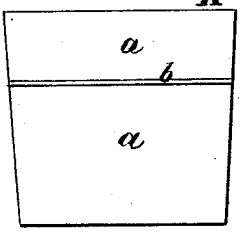

Figure 1 is a plan view of the ice-cream freezer, and Fig. 2 is a vertical section of the same taken through the center. Figs. 3 and 4 represent the invention under a modification. Fig. 3 is a plan; and Fig. 4 is a vertical section of Fig. 3, taken through the center, the bucket for cream being removed from Fig. 4, to better show the refrigerating apparatus. Figs. 5 and 6 represent the invention under a modification. Fig. 5 is a plan, and Fig. 6 is a central vertical section, of the same. Figs. 7 and 8 represent the segment which, in conjunction with the side of the tub, constitutes the salt-compartment. Fig. 7 is a plan, and Fig. 8 is a side elevation, of the same. Fig. 9 is a view of the scraper detached, showing its adjustability.

A is a tub, constructed preferably of wood, as in ordinary ice-cream freezers. B is a top piece, extending across the tub A, and kept in position by cleats fastened to it, and fitting into notches cut into the top of the tub, or in any other suitable manner. C is the bucket for containing cream, which rests in the step D. E is the beater for stirring the cream. It has on one side of the central piece arms for stirring the cream, and on the other side an upright piece, to which is attached a scraper, N, made of wood, and pivoted in the center upon a screw, $n$, for the purpose of scraping the ice-cream from the sides of the bucket. This scraper has a beveled knife-edge, and is pivoted in the center, at $n$, to the beater-frame, which is correspondingly beveled to permit of the sidewise adjustment of the scraper to suit buckets of various shapes. F is the bucket-top, having upon it the cog-wheel F'. G is a cog-wheel, fixed upon the shaft H, and turned by the crank I, for the purpose of revolving the bucket C. K K are segments, made of sheet metal, which, with the sides of the tub, form the salt-compartments 1 1. These latter may be extended down to the bottom of the tub A, if desired, although the arrangement herein shown and described is found to answer best. Each segment consists of the side piece $a$ and the bottom piece $b$. The space between the segments, bounded by the sides of the segments, the side of the tub A, and the cream-bucket C, constitute the ice-compartments 2 2. That part of the segments K K above the bottom $b$ is especially designed to form the salt-boxes 1 1, and these upper portions of the side pieces $a\ a$ and the bottoms $b\ b$ are perforated with small holes, which allow the salt to communicate freely with the brine, while they prevent it from escaping in quantities. The side pieces $a\ a$ are extended below the bottom $b$, in order to form the sides of the ice-compartments 2 2, and prevent the ice from spreading beneath the salt-boxes. This lower portion of the side pieces $a\ a$ is perforated with large holes to allow free communication between the ice and the brine.

In Figs. 3 and 4 the form of the segments K K is modified, the central part of the side piece $a$ conforming to the shape of the cream-bucket C, and thus modifying the form of both the salt and the ice compartments. In this modification the side pieces $a\ a$ do not extend below the bottom of the salt-compartment, thus allowing the ice to spread out beneath the salt-compartments, and entirely surround the cream-bucket C.

In Figs. 5 and 6 a further modification is presented, strips of sheet metal $c$ being attached to the side pieces $a\ a$, in order to connect them into a united body. By removing the strips $c\ c$, the segments K K in Fig. 5 are identical with the segments K K in Fig. 3, except that the side pieces *a a* in Figs. 5 and 6 extend down below the bottom of the salt-boxes, as they do in Figs. 1 and 2.

These modifications constitute immaterial variations, all having the same essential features of construction, in the salt-compartment, being constructed to hold the salt in contact with the top of the brine, in order to keep it saturated, and the ice-compartment extending down to the bottom of the brine, while both the salt and ice compartments are open at the top, so as to allow the refrigerating materials to be replenished as needed.

It is unessential whether the ice be kept confined by the downward extension of the side pieces *a a*, as in Figs. 1, 2, 5, and 6, or be suffered to surround the cream-bucket C, as in Figs. 3 and 4. It is also unessential whether the segments K be separate, as in Figs. 1, 2, 3, and 4, or be united by the strips *c c*, as in Figs. 5 and 6; the only difference being that, when separate, they must be supported by nails fixed in the side of the tub, while, when united, they support themselves by contact with the side of the tub.

L is the waste-pipe, through which the brine escapes. It is placed in the bottom of the tub A because the brine is warmest there, and it extends up to the height at which it is desired to keep the brine in the tub.

In Fig. 4 a modification is presented, the waste-pipe L being inserted into the tub A at the level at which the brine is required to stand.

M, Fig. 1, is a bar hinged upon the cross-piece B, for the purpose of fitting into the slotted top of the beater E. When M is taken out of connection, the beater will turn with the cream-bucket C; but when M is placed in the slot, the beater E is prevented from turning, and the scraper N removes the ice-cream from the sides of the cream-bucket as it revolves.

The mode of operating this apparatus is as follows: After the cream-bucket C is in place, fill the tub A with strong brine up to the bottom of the salt-compartments. Then fill the salt-compartments with salt, and fill the ice-compartments with ice. This will bring the brine to the required level. As ice and salt are added from time to time, the brine will flow off through the pipe L. While the refrigerating materials are supplied as exhausted, the brine will be kept at a regular temperature far below the freezing-point.

In ordinary freezers the greater part of the ice melts before the freezing process is complete, and the salt soon sinks to the bottom of the freezer. As soon as this occurs the remaining ice floats on the top in water comparatively fresh, and the temperature of the brine rises to a point at which it fails to freeze efficiently. Usually the force of the refrigerating materials is spent by the time the cream is frozen, and in order to keep the cream the brine must be emptied out, and the tub repacked with ice and salt.

In my invention this difficulty is obviated, since, by the regular addition of refrigerating materials as required, the brine is kept constantly at a reduced temperature.

Having thus described my invention, what I claim as new is—

1. The segments K, in combination with the tub A, the cream-bucket C, the waste-pipe L, the beater E, hinged bar M, cogs F', cog-wheel G, shaft H, and crank I, substantially as set forth.

2. The salt-compartments 1 1, in combination with the ice-compartments 2 2, the tub A, and cream-bucket C, for the purpose mentioned.

3. The ice-compartments 2 2, extending down to the bottom of the brine, in combination with the salt-compartments 1 1, the tub A, and the cream-bucket C, as described.

4. The ice-compartments 2 2, extending down to the bottom of the brine, in combination with the salt-compartments 1 1, the tub A, and cream-bucket C, and the waste-pipe L, as described.

5. The scraper N, having a beveled knife-edge, and pivoted at its center to the beater-frame, which is beveled, to permit of sidewise adjustment of the scraper, substantially as herein set forth.

LUCIEN B. WOOLFOLK.

Test:
I. N. WILLIAMS,
CHAS. GIBSON.